United States Patent
Nakaishi et al.

[11] Patent Number: 6,041,886
[45] Date of Patent: Mar. 28, 2000

[54] REAR-WHEEL STEERING SYSTEM

[75] Inventors: Takamichi Nakaishi, Toyota; Akiya Taneda, Anjo; Shinji Tanizaki, Aichi-ken; Toshihiko Yamanaka, Kariya; Kozo Fujita, Aichi-ken, all of Japan

[73] Assignees: Aisin Seiki Kabushiki Kaisha, Kayira; Toyota Jidosha Kabushiki Kaisha, Toyota, both of Japan

[21] Appl. No.: 09/110,972

[22] Filed: Jul. 7, 1998

[30] Foreign Application Priority Data

Jul. 8, 1997 [JP] Japan ................................. 9-182588

[51] Int. Cl.[7] ........................................................ B62D 5/04
[52] U.S. Cl. ............................ 180/444; 180/445; 180/443; 74/89.15
[58] Field of Search ..................... 180/443, 444, 180/445, 412, 413; 74/89.15, 586, 441

[56] References Cited

U.S. PATENT DOCUMENTS

| 3,730,016 | 5/1973 | Miller | 74/424.8 B |
|---|---|---|---|
| 4,467,885 | 8/1984 | Furukawa et al. | 180/414 |
| 5,086,861 | 2/1992 | Peterson | 180/445 |
| 5,131,485 | 7/1992 | Io et al. | 180/445 |
| 5,284,220 | 2/1994 | Shimizu et al. | 180/140 |
| 5,487,439 | 1/1996 | Kabuto et al. | 180/445 |

FOREIGN PATENT DOCUMENTS

| 2 605 280 | 10/1987 | France . |
|---|---|---|
| 7-47963 | 2/1995 | Japan . |
| 7-21526 | 8/1995 | Japan . |
| 7-285450 | 10/1995 | Japan . |
| 2 198 098 | 6/1988 | United Kingdom . |

*Primary Examiner*—Brian L. Johnson
*Assistant Examiner*—Deanna Draper
*Attorney, Agent, or Firm*—Burns, Doane, Swecker & Mathis, LLP

[57] ABSTRACT

A rear-wheel steering system designed to reduce noise to a minimum at a low cost. The rear-wheel steering system includes an electric motor for generating a rotational force, a nut member connected to the electric motor and rotated thereby, and a rod having both ends connected to rear wheels of a vehicle and an external thread portion in mesh with an internal thread portion of the nut member. The rod is axially moved by rotation of the nut member for rear-wheel steering, but is not allowed to rotate. In the system, the internal thread portion is in mesh with the external thread portion such that each axial center is off-center.

9 Claims, 4 Drawing Sheets

REAR-WHEEL STEERING SYSTEM

INCORPORATION BY REFERENCE

The disclosure of Japanese Patent Application No. HEI 9-182588 filed on Jul. 8, 1997, including the specification, drawings and abstract, is incorporated herein by reference in its entirety.

BACKGROUND OF THE INVENTION

1. Field of the Invention

The present invention relates to a rear-wheel steering system of a motor vehicle.

2. Description of the Related Art

A rear-wheel steering system of a motor vehicle is disclosed in, for example, Japanese Patent Application Laid-Open 7-215226. This rear-wheel steering system is provided with a nut member contained in a housing and connected to an electric motor through a planetary gear unit, and a rod having an external thread portion in mesh with an internal thread portion of the nut member. In such a system, the rod is laterally moved across a width of the vehicle by rotation of the electric motor so as to steer rear wheels connected thereto.

Another rear-wheel steering system having similar structural features as that of the above-described system is disclosed in Japanese Patent Application Laid-Open 7-285450.

Referring to FIG. 3, the generally employed rear-wheel steering system as described above has a nut member 120 for converting a rotational motion of an electric motor into an axial straight motion of a rod 110. The nut member 120 has an internal thread portion 120a, which is engaged with an external thread portion 110a of the rod 110. In the course of machining those thread portions 120a and 110a, however, each dimension thereof is likely to vary depending on the individual machining process condition. As a result, looseness between the internal thread portion 120a and the external thread portion 110a is unavoidably generated. Such looseness may cause the wheel of the running vehicle to slightly vibrate, leading to noise from the thread portions in mesh with each other.

In order to eliminate the looseness between the internal and external thread portions, the precision of machining the thread portions has to be improved. However, this may raise production costs substantially.

SUMMARY OF THE INVENTION

In view of the foregoing, an object of the present invention is to provide a rear-wheel steering system in which a looseness between internal and external thread portions in mesh with each other is compensated for reducing the noise generated in the meshed thread portions without raising the costs of producing the threaded portions.

To achieve the above-mentioned object, the present invention provides a rear-wheel steering system including an electric motor for generating a rotational force, a rotational member connected to the electric motor and rotated thereby, a movable member axially moved by rotation of the rotational member for steering rear wheels of a vehicle to which both ends of the movable member are connected, an internal thread portion provided with the rotational member, and an external thread portion provided with the movable member in mesh with the internal thread portion. The external thread portion is not allowed to rotate. Furthermore, the internal and external thread portions are engaged such that each axial center thereof is off-centered. The internal thread portion of the rotational member and the external thread portion of the movable member, meshed with each other, are off-centered. This arrangement compensates for the looseness between the thread portions in mesh with each other, thus reducing the noise during running of the vehicle at a low cost.

The present invention is further provided with a first support portion for radially supporting the rotational member, a second support portion for radially supporting the movable member, and a housing in which each axial center of the first support portion and the second support portion is off-centered. As the housing is structured such that each axial center of the first support portion radially supporting the rotational member and the second support portion radially supporting the movable member is off-centered, the internal thread portion of the rotational member and the external thread portion of the movable member, thus, can easily be off-centered.

The present invention is further provided with a first support portion for radially supporting the rotational member, and a housing containing a second support portion for radially supporting the movable member. A slide portion supported by the second support portion of the movable member and an axial center of the external thread portion are off-centered. As the slide portion supported by the second support portion of the movable member and the axial center of the external thread portion are off-centered, the internal thread portion of the rotational member and the external thread portion of the movable member can easily be off-centered.

DESCRIPTION OF THE PREFERRED EMBODIMENT

Figure 1:
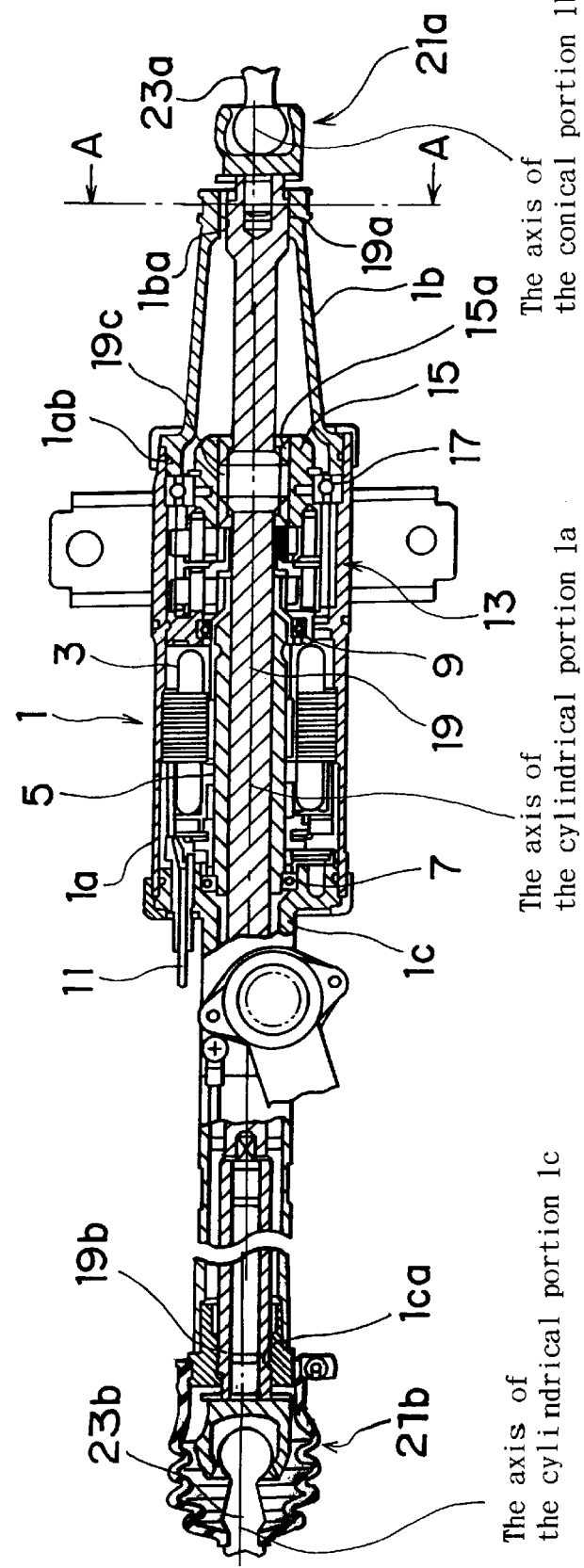
FIG. 1 is a cross-sectional view of a rear-wheel steering system according to the present invention.

Referring to the drawings, the present invention will be described with respect only to a characteristic portion thereof.

FIG. 1 is a cross-sectional view of a rear-wheel steering system according to the present invention. In FIG. 1, a housing 1 is defined by a cylindrical portion 1a, a conical portion 1b fitted therewith, and a cylindrical portion 1c. The cylindrical portion 1a has a diameter larger than that of the cylindrical portion 1c. The cylindrical portion 1a contains a brushless motor 3 therein. A hollow rotational shaft 5 is disposed to pass through the inside of the brushless motor 3.

The hollow rotational shaft 5 is rotatably supported by the inner periphery of the cylindrical portion 1c with a bearing 7 as represented on the left-hand side of FIG. 1. Meanwhile the hollow rotational shaft 5 is rotatably supported by the inner periphery of the cylindrical portion 1a with a bearing 9 as represented on the right-hand side of FIG. 1. The brushless motor 3 is connected to a power source (not shown) of a motor vehicle through a harness 11.

The hollow rotational shaft 5 is connected to a planetary gear unit 13 disposed in series at two stages. An output side of the second stage of the planetary gear 13 is connected to a nut member 15. The nut member 15 is attached to the housing 1 such that the nut member is not permitted to move linearly with respect to the housing. However, the nut member 15 is rotatably supported by an inner periphery 1ab of the cylindrical portion 1a with a bearing 17, and is thus rotatable with respect to the housing 1. In the aforementioned arrangement, the rotation of the brushless motor 3 is decelerated by the planetary gear unit 13, which is transmitted to the nut member 15. Thus, the brushless motor 3 causes the nut member 15 to rotate with respect to the stationary conical portion 1b of the housing 1.

Figure 4:
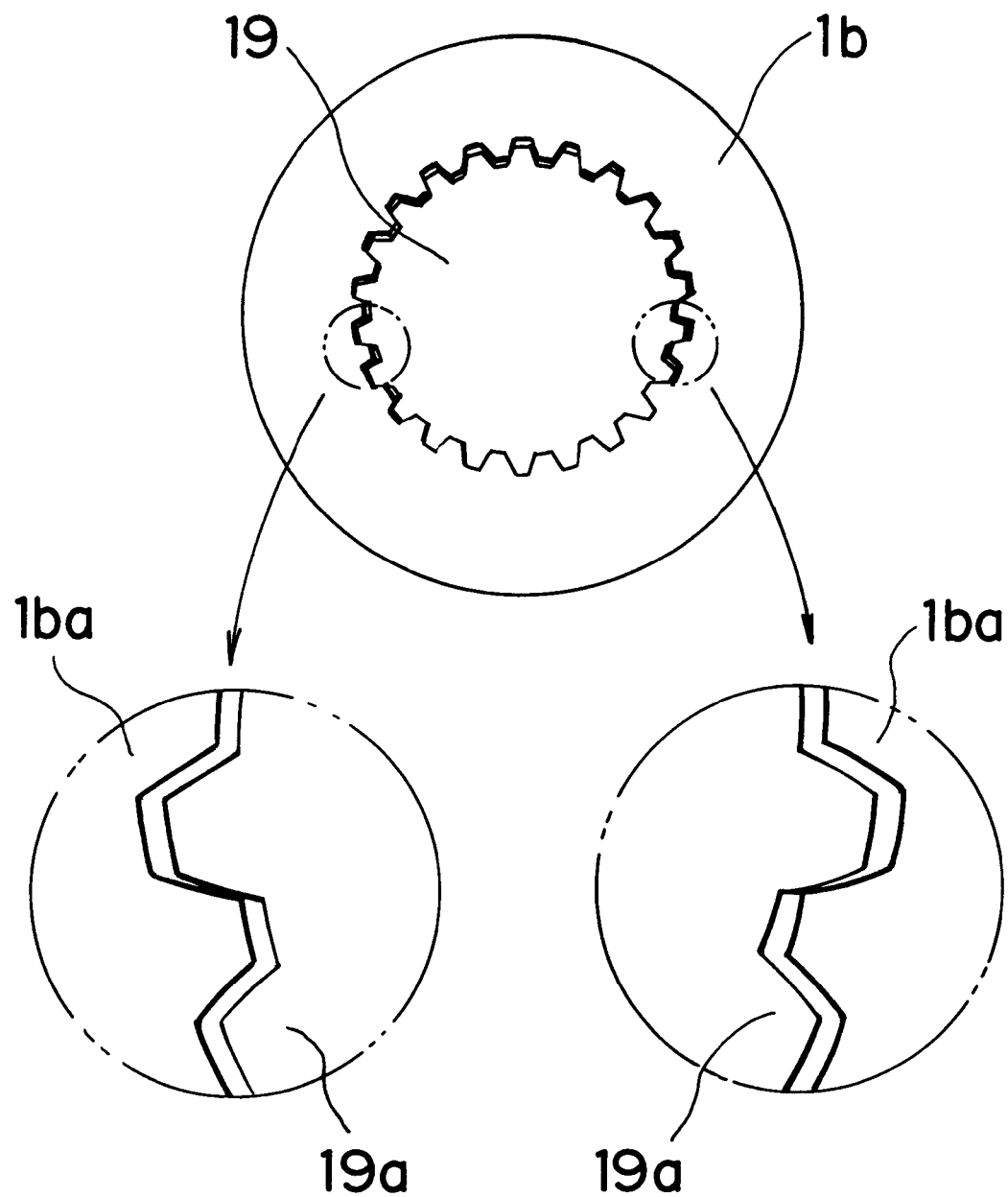
FIG. 4 is a cross-sectional view taken along line A—A of FIG. 1.

A spline portion 19a located at a right end of a rod 19 as shown in FIG. 1 is fitted with a support portion 1ba having a spline provided for the conical portion 1b such that the spline portion 19a is slidably supported by the conical portion 1b axially. That is, as shown in FIG. 4, the conical portion 1b, or an insert positioned therein, has a plurality of teeth that extend parallel with the longitudinal axis of the rod 19 and that mate with corresponding parallel teeth on the rod 19. Thus, relative linear movement can occur between the rod 19 and the conical portion 1b, but rotational movement between the rod 19 and the conical portion 1b is prevented.

Similarly, a slide portion 19b of the rod 19 is located at a left end of the rod 19 as shown in FIG. 1 and is fitted with a bushing 1ca made of a low friction material. The bushing 1ca can be integral with the housing 1 or can be a separate item attached to the housing 1. The bushing 1ca is connected to the cylindrical portion 1c of the housing 1. The bushing 1ca is received by the cylindrical portion 1c and the bushing receives the slide portion 19b. The slide portion 19b is slidably supported by the bushing 1ca located in cylindrical portion 1c axially. The rod 19, thus, is slidably axially supported by the cylindrical portion 1c, and relative linear movement can occur between the rod 19 and the bushing 1ca (and cylindrical portion 1c). The bushing 1ac and the slide portion 19b are configured such that rotational movement between the bushing 1ac and the slide portion 19b is prevented. Accordingly, the rod 19 is supported by the housing 1 non-rotatably.

The rod 19 has an external thread portion 19c disposed at a position apart from its right end by approximately ¼ of the whole length thereof as shown in FIG. 1. The external thread portion 19c is engaged with the internal thread portion 15a of the nut member 15, by which the rotational motion transmitted to the nut member 15 is converted into a straight motion of the rod 19. For example, male threads on the rod 19 are received by female threads on the nut member 15. Because the nut member 15 is permitted to rotate but is not permitted to move linearly, rotation of the nut member 15 with respect to the rod 19 will cause the rod to move linearly.

Both ends of the rod 19 are connected to tie rods 23a, 23b through universal joints 21a, 21b respectively. The tie rods 23a, 23b are connected to rear wheels (not shown) of the motor vehicle. The rotation of the brushless motor 3 moves the rod 19 axially to steer rear wheels of the vehicle.

Figure 2:
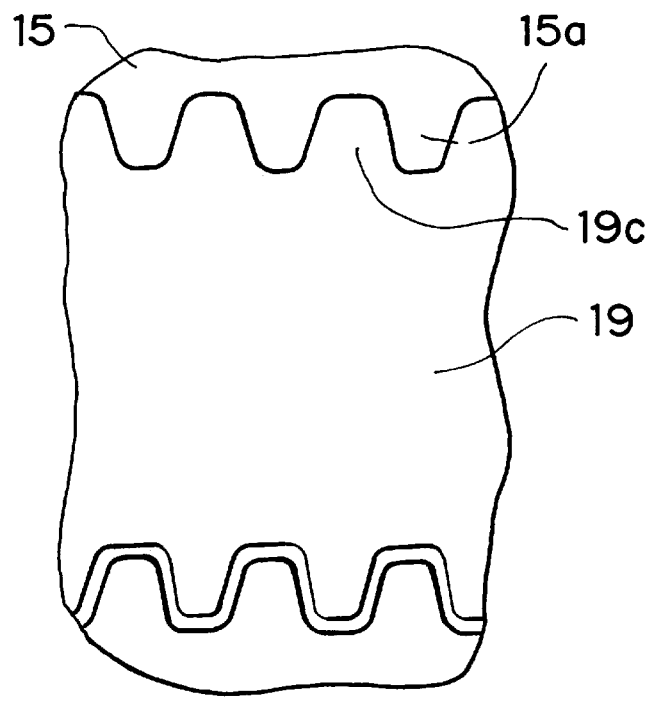
FIG. 2 is a view showing a detailed essential portion of the rear-wheel steering system according to the present invention.
Figure 3:
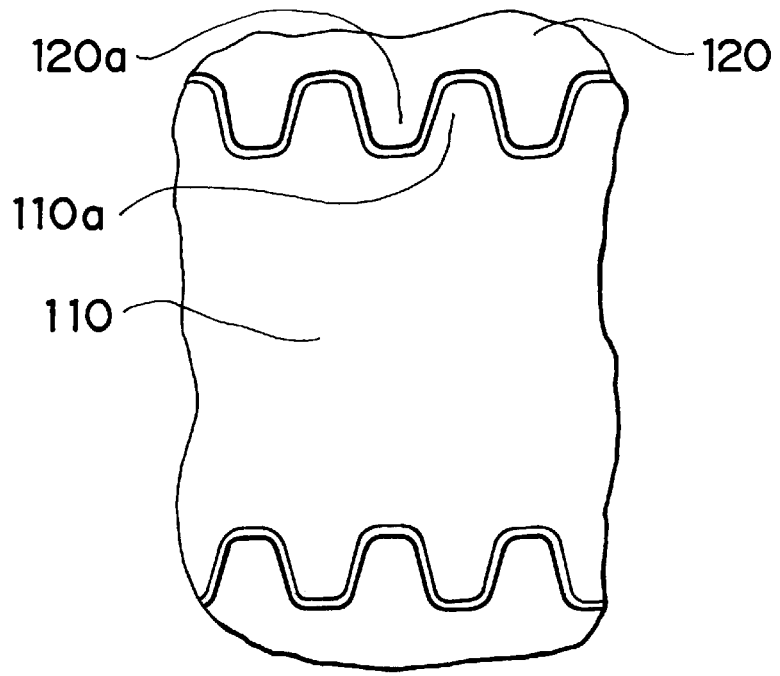
FIG. 3 is a view showing a detailed essential portion of a rear-wheel steering system of a related art.

The support portion 1ba of the conical portion 1b and the bushing 1ca of the cylindrical portion 1c each have a center that is off-center with respect to the axial center of the cylindrical inner periphery 1ab of the cylindrical portion 1a. Accordingly, the axial center of the internal thread portion 15a of the nut member 15 supported by the support portion 1ab is eccentric with respect to the axial center of the external thread portion 19c of the rod 19 supported by the bushing 1ca. That is, the axis of the rod 19 is located away from the center axis of cylindrical inner periphery 1ab of the housing and is, thus, also located away from the center axis of the nut member 15. For example, referring to FIG. 2, the external thread portion 19c is eccentrically disposed upward of the internal thread portion 15a. Thus, the looseness between the meshed internal and external thread portions shown in FIG. 2 is compensated.

If the looseness between the internal thread portion 15a of the nut member 15 and the external thread portion 19c of the rod 19 is compensated in the above-described manner, the rod 19 continuously receives a reaction force or bending moment exerted from the nut member 15, which prevents the rod 19 from substantially vibrating with respect to the nut member 15.

Because the axes of the rod 19 and the nut member 15 are eccentric, each of the axis of the spline portion 19a and slide portion 19b of the rod 19 are also eccentrically disposed downward with respect to each of the center axis of the support portion 1ba of the conical portion 1b and the bushing 1ca of the cylindrical portion 1c as shown in FIG. 4 by the reaction force from the nut member 15 to the rod 19. The eccentricity of the axes of the rod 19 and the housing 1 can be greater or lesser at the spline portion 19a than at the threaded portion 19c. The looseness in the peripheral direction between the spline portion 19a of the rod 19 and the spline of the support portion 1ba of the conical portion 1b can be compensated to prevent the rod 19 from rotating. Because one embodiment of the present invention strives to prevent at least the thread portions 15a, 19c from vibrating, vehicle noise and vibrations are lessened. The rotation of the brushless motor 3, thus, can be efficiently applied to perform rear-wheel steering.

Figure 5:
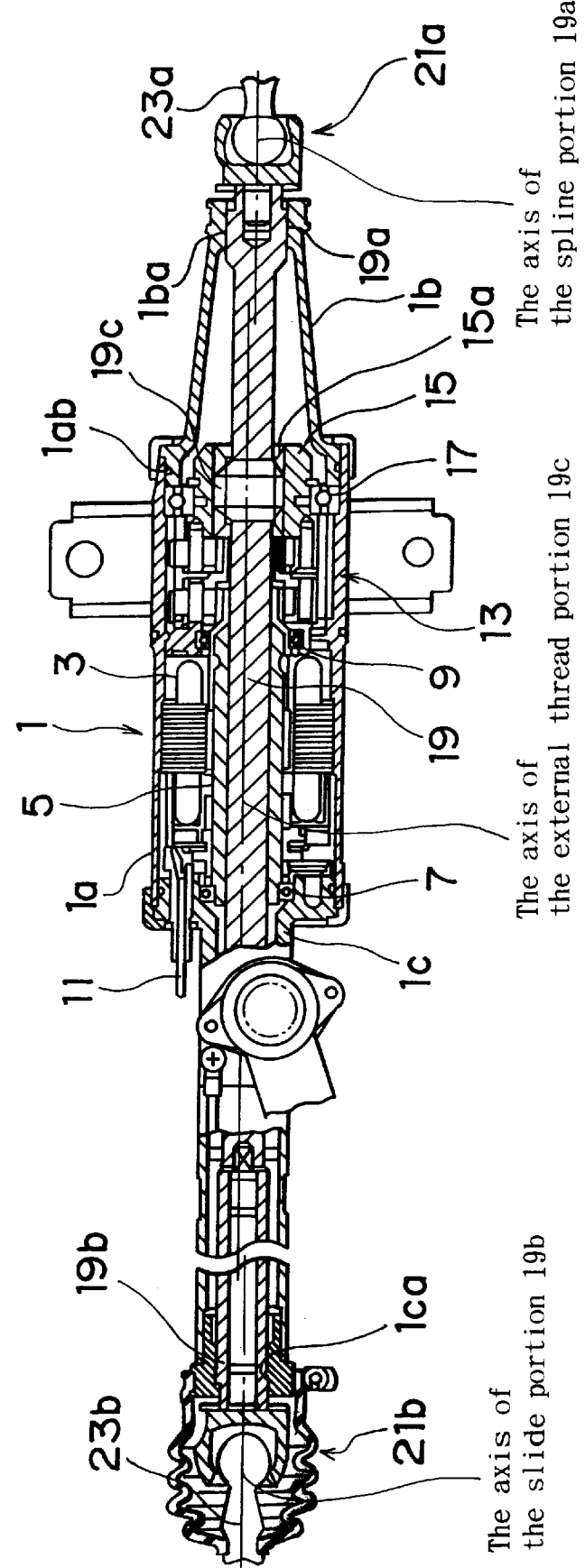
FIG. 5 is a cross-sectional view of a rear wheel steering system according to another embodiment.

The present invention may be structured such that the axial center of the external thread portion 19c is off-center with respect to the axial center of the spline portion 19a and the axial center of the slide portion 19b of the rod 19 as shown in FIG. 5, without causing the axial center of the support portion 1ba of the conical portion 1b and the axial center of the bushing 1ca of the cylindrical portion 1c to be eccentrically off-center with respect to the inner periphery 1ab of the housing 1. The above-described advantages may be obtained by this structure.

The invention claimed is:
1. A rear-wheel steering system comprising:
an electric motor for generating a rotational force;
a rotational member having an axial center and a threaded portion, said rotational member connected to said electric motor and rotated thereby;
a movable member having an axial center and having a threaded portion that meshes with said threaded portion of said rotational member, said movable member axially moved by rotation of said rotational member for steering rear wheels of a vehicle, said axial center of said rotation member located eccentric with respect to said axial center of said movable member.
2. A rear-wheel steering system according to claim 1, further comprising:
a housing having a first support portion having an axial center for radially supporting said rotational member and a second support portion having an axial center for radially supporting said movable member, said axial center of said first support portion located eccentric with respect to said axial center of said second support portion.
3. A rear-wheel steering system according to claim 2, further comprising a bushing having an axial center for radially supporting said movable member, said axial center of said second support portion and said axial center of said bushing each located off-center with respect to said axial center of said first support portion.

4. A rear-wheel steering system according to claim 2, wherein said moveable member includes a slide portion having an axial center and said housing includes a bushing for receiving said slide portion of said movable member, said axial center of said slide portion of said movable member located off-center with respect to said axial center of said threaded portion of said movable member.

5. A rear-wheel steering system according to claim 1, further comprising:

a first support portion for radially supporting said rotational member; and a housing containing a second support portion for radially supporting said movable member, said movable member having a slide portion having an axial center and supported by said second support portion, said axial center of said movable member located eccentric with respect to said axial center of said slide portion.

6. A rear-wheel steering system comprising:

an electric motor;

a rotational member connected to said electrical motor and rotatable by said electrical motor;

a movable member axially movable upon rotation of said rotational member by said electric motor; and a means for substantially preventing said rotational member from vibrating with respect to said movable member.

7. A rear-wheel steering system according to claim 6, wherein rotational member includes an axial center, said movable member includes an axial center, and said preventing means includes said axial center of said rotational member being located eccentric with respect to said axial center of said movable member.

8. A rear-wheel steering system according to claim 6, further comprising a housing supporting a portion of said movable member and having an axial center, said preventing means includes said axial center of said movable member being located eccentric with respect to said axial center of said housing.

9. A rear-wheel steering system according to claim 6, wherein said rotational member and said movable member threadably engage each other.

* * * * *